(12) United States Patent
Schmidt

(10) Patent No.: US 10,179,519 B2
(45) Date of Patent: Jan. 15, 2019

(54) MULTI-BATTERY SYSTEM FOR INCREASING THE ELECTRIC RANGE

(71) Applicant: AUDI AG, Ingolstadt (DE)

(72) Inventor: Jörg Schmidt, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/305,022

(22) PCT Filed: Oct. 18, 2014

(86) PCT No.: PCT/EP2014/002816
§ 371 (c)(1),
(2) Date: Oct. 18, 2016

(87) PCT Pub. No.: WO2015/161861
PCT Pub. Date: Oct. 29, 2015

(65) Prior Publication Data
US 2017/0182910 A1    Jun. 29, 2017

(30) Foreign Application Priority Data

Apr. 24, 2014  (DE) .......................... 10 2014 006 028

(51) Int. Cl.
*B60L 11/18*      (2006.01)
*B60L 3/04*       (2006.01)
*B60L 3/00*       (2006.01)

(52) U.S. Cl.
CPC ......... *B60L 11/1868* (2013.01); *B60L 3/0046* (2013.01); *B60L 3/04* (2013.01);
(Continued)

(58) Field of Classification Search
CPC ................ B60L 11/1868; B60L 3/0046; B60L 11/1864; B60L 11/1853; B60L 11/1861; B60L 3/04
(Continued)

(56) References Cited

U.S. PATENT DOCUMENTS 2,531,472 A * 11/1950 Salazar ................. H02J 7/0003
                                                            320/157
3,182,242 A *  5/1965 Elder ........................ H02P 1/28
                                                            318/780
(Continued)

FOREIGN PATENT DOCUMENTS

DE    10 2009 042 001     3/2011
DE    10 2010 038 886     2/2012
(Continued)

OTHER PUBLICATIONS

International Search Report issued by the European Patent Office in International Application PCT/EP2014/002816.

*Primary Examiner* — Robert Grant
*Assistant Examiner* — John Trischler
(74) *Attorney, Agent, or Firm* — Henry M. Feiereisen LLC

(57) ABSTRACT

A motor vehicle includes an high-voltage power system, a multi-battery system including energy stores for supplying power to an electric drive motor, and switching units connecting the energy stores to the power system. A control device detects a state of charge of each energy store and to selectively connect and/or disconnect the energy stores as a function of their state of charge during travel to and from the power system. The switching units include each contactors to disconnect the energy stores on a plus side and on a minus side from the power system, with only either the positive side or negative side of each energy store including a contactor configured to switch when a load is greater than a minimum load, whereas the other one of the positive and negative sides includes a contactor that is adequate only for a load demand which is less than the minimum load.

9 Claims, 2 Drawing Sheets

(52) U.S. Cl.
CPC ....... *B60L 11/1853* (2013.01); *B60L 11/1861* (2013.01); *B60L 11/1864* (2013.01); *Y02T 10/7005* (2013.01); *Y02T 10/7044* (2013.01); *Y02T 10/7061* (2013.01); *Y02T 10/7066* (2013.01)

(58) Field of Classification Search
USPC ...................................................... 320/104
See application file for complete search history.

(56) References Cited

U.S. PATENT DOCUMENTS

| | | | | |
|---|---|---|---|---|
| 3,342,958 A * | 9/1967 | Arneberg | H01H 50/323 | 200/50.33 |
| 4,025,860 A * | 5/1977 | Shibata | B60L 11/1853 | 180/65.1 |
| 4,101,787 A | 7/1978 | Vail | | |
| 4,575,679 A * | 3/1986 | Chung | G01R 19/16542 | 307/39 |
| 5,177,425 A * | 1/1993 | Goto | H01M 10/441 | 320/130 |
| 5,221,861 A * | 6/1993 | Kinsell | F02N 11/0866 | 123/179.3 |
| 5,418,402 A * | 5/1995 | Fujiwara | H02J 7/1423 | 307/10.1 |
| 5,493,468 A * | 2/1996 | Hunter | H02H 3/006 | 361/31 |
| 5,769,177 A * | 6/1998 | Wickman | B60K 6/00 | 180/65.22 |
| 5,894,415 A * | 4/1999 | Habegger | H02J 7/0031 | 307/85 |
| 5,925,998 A * | 7/1999 | Olson | H02P 1/02 | 307/35 |
| 6,239,579 B1 * | 5/2001 | Dunn | G01R 31/3658 | 320/119 |
| 6,318,966 B1 * | 11/2001 | Madara | F25B 49/025 | 417/12 |
| 6,459,175 B1 * | 10/2002 | Potega | B60L 11/185 | 307/132 M |
| 6,717,300 B2 * | 4/2004 | Pal | G01D 5/2013 | 310/68 B |
| 6,833,683 B2 * | 12/2004 | Winkler | H02J 7/1438 | 320/107 |
| 7,002,265 B2 * | 2/2006 | Potega | B60L 11/185 | 307/149 |
| 7,039,821 B1 * | 5/2006 | Potega | G06F 1/1632 | 327/100 |
| 7,127,623 B2 * | 10/2006 | Potega | G06F 1/1632 | 713/300 |
| 7,196,884 B2 * | 3/2007 | Guzman-Casillas | H02H 3/28 | 307/134 |
| 7,253,584 B2 * | 8/2007 | Souther | B60L 11/1851 | 320/104 |
| 7,456,601 B2 * | 11/2008 | Bixel | H02P 1/02 | 307/115 |
| 7,489,048 B2 * | 2/2009 | King | B60L 11/1864 | 307/10.1 |
| 8,004,109 B2 * | 8/2011 | Komatsu | H02M 5/4585 | 307/115 |
| 8,072,725 B2 * | 12/2011 | Kosaki | H02H 5/00 | 361/23 |
| 8,129,951 B2 * | 3/2012 | Turner | B60L 11/14 | 320/134 |
| 8,146,694 B2 * | 4/2012 | Hamidi | B60K 1/04 | 180/68.5 |
| 8,294,409 B2 * | 10/2012 | Said | H02P 25/20 | 123/566 |
| RE43,956 E * | 2/2013 | King | B60L 11/1864 | 307/10.1 |
| 8,378,623 B2 * | 2/2013 | Kusch | B60L 11/005 | 320/104 |
| 8,390,145 B2 * | 3/2013 | Harding | B60R 16/033 | 307/10.1 |
| 8,441,228 B2 * | 5/2013 | Brabec | B60L 11/1861 | 180/65.21 |
| 8,442,727 B2 * | 5/2013 | Yamamoto | B60W 10/24 | 320/109 |
| 8,541,905 B2 * | 9/2013 | Brabec | B60L 11/1861 | 307/10.7 |
| 8,581,448 B2 * | 11/2013 | Ichikawa | B60K 6/445 | 307/10.1 |
| 8,598,847 B2 * | 12/2013 | Eberhard | H02J 7/0016 | 320/126 |
| 8,655,535 B2 * | 2/2014 | Oh | B60L 15/2045 | 701/22 |
| 8,698,451 B2 * | 4/2014 | King | B60L 7/12 | 307/43 |
| 8,963,481 B2 * | 2/2015 | Prosser | H02J 7/0054 | 320/103 |
| RE45,431 E * | 3/2015 | King | B60L 11/1864 | 307/10.1 |
| 8,981,727 B2 * | 3/2015 | Kusch | B60L 11/1868 | 320/134 |
| 8,994,327 B2 * | 3/2015 | Kusch | B60L 11/1812 | 320/109 |
| 9,007,020 B2 * | 4/2015 | Prosser | H02J 7/0054 | 320/104 |
| 9,225,159 B2 * | 12/2015 | Vangool | H01H 83/04 | |
| 9,312,717 B2 * | 4/2016 | Nogi | B60M 3/06 | |
| 9,434,261 B2 * | 9/2016 | Bemrich | G01R 31/3278 | |
| 9,579,989 B2 * | 2/2017 | Schmidt | H01M 10/482 | |
| 9,713,961 B2 * | 7/2017 | Fan | B60L 11/1816 | |
| 9,762,058 B2 * | 9/2017 | Youn | G06F 1/30 | |
| 9,793,722 B2 * | 10/2017 | Tamura | B60R 16/033 | |
| 9,876,359 B2 * | 1/2018 | Wang | H02J 3/1807 | |
| 2002/0146617 A1 * | 10/2002 | Johnson | B64G 1/425 | 429/50 |
| 2003/0085621 A1 * | 5/2003 | Potega | B60L 11/185 | 307/18 |
| 2004/0130288 A1 * | 7/2004 | Souther | B60L 11/1851 | 320/104 |
| 2004/0195998 A1 * | 10/2004 | Winkler | H02J 7/1438 | 320/104 |
| 2006/0005055 A1 * | 1/2006 | Potega | G06F 1/1632 | 713/300 |
| 2008/0024087 A1 * | 1/2008 | Bixel | H02P 1/02 | 318/783 |
| 2010/0038962 A1 * | 2/2010 | Komatsu | H02M 5/4585 | 307/10.1 |
| 2010/0123989 A1 * | 5/2010 | Kosaki | B60K 6/365 | 361/93.9 |
| 2010/0181129 A1 | 7/2010 | Hamidi | | |
| 2010/0296204 A1 * | 11/2010 | Ichikawa | B60K 6/445 | 361/15 |
| 2011/0001352 A1 * | 1/2011 | Tamura | B60R 16/033 | 307/9.1 |
| 2011/0025124 A1 * | 2/2011 | Brabec | B60L 11/1861 | 307/9.1 |
| 2011/0025125 A1 * | 2/2011 | Brabec | B60L 11/1861 | 307/9.1 |
| 2011/0025126 A1 * | 2/2011 | Brabec | B60L 11/1861 | 307/9.1 |
| 2011/0031931 A1 * | 2/2011 | Rembach | B63H 21/20 | 320/128 |
| 2011/0148353 A1 * | 6/2011 | King | B60L 7/12 | 320/109 |
| 2012/0013297 A1 * | 1/2012 | Turner | B60L 11/14 | 320/109 |
| 2012/0043921 A1 * | 2/2012 | Said | H02P 25/20 | 318/773 |
| 2012/0091731 A1 * | 4/2012 | Nelson | H02J 7/0024 | 290/1 R |
| 2012/0112693 A1 * | 5/2012 | Kusch | B60L 11/005 | 320/109 |
| 2012/0143425 A1 * | 6/2012 | Yamamoto | B60K 6/365 | 701/22 |
| 2013/0049684 A1 * | 2/2013 | Kusch | B60L 11/1812 | 320/109 |

(56) References Cited

U.S. PATENT DOCUMENTS

| | | | | |
|---|---|---|---|---|
| 2013/0093427 A1* | 4/2013 | Bemrich | ............ | G01R 31/3278 324/418 |
| 2013/0099596 A1* | 4/2013 | Ichikawa | ............... | B60K 6/445 307/115 |
| 2013/0116875 A1* | 5/2013 | Oh | ...................... | B60L 15/2045 701/22 |
| 2013/0234508 A1 | 9/2013 | Eisele et al. | | |
| 2013/0307476 A1* | 11/2013 | Darragh | .................... | B60L 3/00 320/109 |
| 2013/0307478 A1* | 11/2013 | Boggs | ...................... | B60L 3/00 320/112 |
| 2013/0307480 A1* | 11/2013 | Boggs | ...................... | B60L 3/00 320/118 |
| 2013/0307489 A1* | 11/2013 | Kusch | ................. | B60L 11/1868 320/162 |
| 2013/0334878 A1* | 12/2013 | Brabec | ................ | B60L 11/1861 307/9.1 |
| 2014/0001844 A1* | 1/2014 | Krieg | .................... | B60L 3/0046 307/10.7 |
| 2014/0070770 A1* | 3/2014 | Nogi | ........................ | B60M 3/06 320/116 |
| 2014/0091767 A1* | 4/2014 | Tamura | ................. | B60R 16/033 320/126 |
| 2014/0168830 A1* | 6/2014 | Vangool | ................. | H01H 83/04 361/47 |
| 2014/0265600 A1* | 9/2014 | Tsukamoto | ............... | H02J 1/00 307/77 |
| 2014/0274219 A1* | 9/2014 | Reeder | ...................... | H02J 7/00 455/573 |
| 2015/0008746 A1* | 1/2015 | Youn | ........................ | G06F 1/30 307/65 |
| 2015/0028669 A1* | 1/2015 | Schmidt | .............. | H01M 10/482 307/9.1 |
| 2015/0097527 A1* | 4/2015 | DeDona | .............. | B60L 11/1818 320/109 |
| 2015/0103457 A1* | 4/2015 | Shander | .................. | H02J 3/006 361/88 |
| 2015/0183328 A1* | 7/2015 | Kusch | ................. | B60L 11/1868 320/109 |
| 2015/0277473 A1* | 10/2015 | Gauthier | ............... | B60L 11/123 320/137 |
| 2016/0082850 A1* | 3/2016 | Yamasaki | ................. | B60L 3/00 290/3 |
| 2016/0089992 A1* | 3/2016 | Le | ......................... | H02J 7/0003 320/107 |
| 2016/0134160 A1* | 5/2016 | Schultz | ............... | H01M 10/441 307/66 |
| 2016/0176303 A1* | 6/2016 | Nelson | ................ | B60L 11/1805 307/10.1 |
| 2016/0218328 A1* | 7/2016 | Schmidt | .............. | H01M 2/0242 |
| 2016/0272076 A1* | 9/2016 | Fan | ...................... | B60L 11/1816 |
| 2016/0336623 A1* | 11/2016 | Nayar | ..................... | H01M 4/38 |
| 2016/0352131 A1* | 12/2016 | Nelson | ................. | H02J 7/0068 |
| 2017/0080883 A1* | 3/2017 | Yasunori | ................ | B60R 16/02 |
| 2017/0101029 A1* | 4/2017 | Kawano | ................ | B60L 11/1842 |
| 2017/0310107 A1* | 10/2017 | Youn | ........................ | G06F 1/30 |

FOREIGN PATENT DOCUMENTS

| | | |
|---|---|---|
| DE | 10 2010 062 249 | 6/2012 |
| DE | 10 2011 089 135 | 6/2013 |
| EP | 2 104 199 | 9/2009 |
| WO | WO 2013/186209 | 12/2013 |

* cited by examiner

MULTI-BATTERY SYSTEM FOR INCREASING THE ELECTRIC RANGE

CROSS-REFERENCES TO RELATED APPLICATIONS

This application is the U.S. National Stage of International Application No. PCT/EP2014/002816, filed Oct. 18, 2014, which designated the United States and has been published as International Publication No. WO 2015/161861 and which claims the priority of German Patent Application, Serial No. 10 2014 006 028.4, filed Apr. 24, 2014, pursuant to 35 U.S.C. 119(a)-(d).

BACKGROUND OF THE INVENTION

The invention relates to a motor vehicle with an electric motor, an on-board high-voltage power supply, and several energy stores, for examples high-voltage batteries which form a multi-battery system and are provided to supply energy to an electric drive motor, with the multi-battery system being connected via a switching unit with an inverter that controls the electric motor. The switching unit separates hereby this multi-battery system galvantically from the on-board high-voltage power supply. The invention also relates to a method of operating the motor vehicle.

An on-board high-voltage power supply and a high-voltage energy store are typically provided in an electric vehicle, such as, for example, a hybrid vehicle or a battery-powered vehicle.

High-voltage batteries in electrical and hybrid vehicles have a storage capacity (in ampere hours) and a high-volt voltage, involving here an electrical voltage of greater than 60 volts, particularly greater than 100 volts, the product of which establishing the energy and thus the range that can be achieved with this battery. The maximum voltage is limited by the semiconductor components in the power electronics, and the capacity by the cell capacity. A further increase of the cell capacity makes them potentially more unsafe. Another solution involves the parallel connection of the cells in the battery and thus increase of the capacity.

It has been considered disadvantageous in the art that a parallel connection of the cells leads to compensating currents between the cells connected in parallel and thus to energy losses. Therefor, such circuits are undesirable.

DE 10 2009 042 001 A1 describes a vehicle with an electric drive and a battery, and having a receiving device for a second battery. The supply of electric drive can be assumed by both the one battery and the other battery. The two batteries can each be charged and discharged via a control device. A central control unit determines a desired target signal which determines the route with the aid of a navigation system and the driver's destination input. The central control unit decides which of the two batteries is used for the route on the basis of these data and data based on the remaining storage capacities of the batteries as transmitted from the battery control devices.

DE 10 2010 038 886 A1 discloses a distributed battery system for motor vehicles, in which at least two spatially separate battery modules and a central battery control unit are provided for monitoring.

The disadvantage of the mentioned battery systems, however, is that during a travel cycle only one battery is available, i.e. decision must be made before departure as to which battery has the needed state of charge for reaching the destination. Accordingly, one of the two batteries is assigned to the drive. If neither of these batteries has sufficient capacities for reaching the destination, the central control device schedules travel stops at charging stations or battery exchange stations. When the central control unit is not aware of the length of the route, the battery with greater storage capacity is automatically made available. The driver thus has to stop the vehicle in order to change the driving mode from one battery to the other battery.

DE 10 2010 062 249 A1 discloses an apparatus for use in an electrical drive system of a motor vehicle with at least two battery systems having load outputs which are united into a common load output. The load output of each battery system can hereby be connected and disconnected at the common load output by means of a pre-load circuit.

SUMMARY OF THE INVENTION

It is an object of the present invention to increase the electric range of a motor vehicle, in particular of an electric or hybrid vehicle.

This object is achieved according to the invention by a motor vehicle and by a method with the features of the respective independent patent claims. Advantageous embodiments of the invention are subject matter of the dependent claims, the description and the figures.

A motor vehicle according to the invention has an on-board high-voltage power system to which several batteries can be connected via a switching device. The on-board high-voltage power supply includes an inverter which controls an electric drive motor. Provision is made in accordance with the invention for each battery to be connected with the on-board high-voltage power supply via a separate switching unit and for the control unit to be configured such as to detect the state of charge of the batteries and to selectively connect the batteries to and/or disconnect the batteries from the on-board high-voltage power supply also during travel.

This results in the advantage that the driver is able to use several batteries during travel. Moreover, it is not necessary to previously specify the route.

In addition, the switching device which connects the batteries to the on-board high-voltage power supply, includes contactors. The contactors separate the plus and the minus side of each battery from the on-board high-voltage power supply, with only one of the contactors per battery being configured to switch under load, i.e. when a driving current is greater than a minimum current. A minimum current is to be understood as a current of at least one ampere, in particular at least 10 amperes. This results in the advantage that the driver does not have to stop in order to put the vehicle in a state in which no current flows between the battery and the on-board high-voltage power supply so as to then disconnect the one battery from the on-board high-voltage power supply and to connect the other battery thereto. The contactors are preferably designed in a known way to switch even under load, without encountering, for example, arcs or sudden flows of high currents that could lead to the destruction of components.

This contactor which switches, when the load is greater than the minimum load predefined by the afore-mentioned minimum current, is hereinafter referred to as special contactor. The contactor of the other line, however, is a contactor which is adequate only for lower load demands and is hereinafter referred to as simple contactor. In other words, this means that, for example, only the lines of the positive poles of the batteries are provided with the special contactors, while the negative lines are connected with the on-board high-voltage power supply via simple contactors.

These simple contactors are only used to disconnect the on-board high-voltage power supply completely from the battery system, when the vehicle is at a standstill. Since no driving current flows, when the vehicle is at a standstill, these contactors only need to be configured to switch, when currents are smaller than the specified minimum current. This results in the advantage that the expensive special contactors can be partially replaced by lower-cost, simple contactors.

It has proven to be particularly advantageous, when only one of the several available batteries is connected at all times directly to the on-board high-voltage power supply. In other words, this means that there is never a situation when two or more batteries are connected in parallel to supply the drive train with electric energy. This results in the advantage that high compensating currents due to different state of charges or potential levels are avoided between batteries that are connected in parallel. Thus, energy losses are reduced.

It is particularly preferred, when the control device is identical to an inverter that normally controls the electric drive motor. This results in the advantage that there is no need for installation of additional electronics in the motor vehicle. In addition, an actual load demand can easily be determined.

It is particularly preferred, when the control device is configured to detect during travel an operating state, in which a bad demand is less than a predefined threshold value. In other words, this means that during travel the presence of an operating state is possible, in which no driving current or only a very small driving current flows. This state, which is absent of a load demand, is referred to as "coasting".

The switching process, i.e. the disconnection of the one battery from the on-board high-voltage power supply and the connection of the other battery to the on-board high-voltage power supply occurs here during coasting. This results in the advantage that there is no need to use special contactors, but rather only simple contactors, resulting in cost savings.

Provision may also be made for accommodation of the batteries in a common housing or for dispersing them in the vehicle. In other words, the invention has a high flexibility of arrangement in the vehicle.

It can also be provided that the batteries have different performance data. For example, one of several batteries can be configured to rapidly charge, while having lower storage capacity, while another battery has a high capacity, but a lower charge rate. This results in the advantage that, depending on the load demand, one of the several batteries can be selected. In other words, the battery can be selected according to battery type and driving mode, whereby a distinction is made, for example, between the driving modes city driving with recuperative phases and cross-country travel, characterized by a uniform discharge and large amount of energy. For example, the rapidly charging battery can be used very efficiently for short trips or in city traffic with recuperative operation while the battery with high storage capacity can be preferably used for long distances at steady pace.

The method according to the invention provides that the control device detects the state of charge of an energy store and, dependent on this state of charge, selectively connects one of the plurality of energy stores to the on-board high-voltage power supply and again disconnects it from there, with the respective energy store being separated on the plus side and the minus side from the on-board high-voltage power supply by contactors and with only either the plus side or the minus side of each of the plurality of energy stores including a contactor which is configured to switch in the presence of a load greater than a minimum load, while the other side has a contactor which satisfies only a lesser load demand than those of the minimum load. In addition, the control unit is also capable to determine the actual load demand, for example to recognize the afore-described "coasting" so as to then execute the switching operation in a state without load demand. In this case, it is possible to provide the simple contactors instead of the special contactors.

According to one embodiment of the method, it may be provided that the driver is prompted by an output device, such as a warning light and an acoustic signal, to stop for implementation of the switching operation. As soon as the control device has determined a state of charge of the battery currently connected to the on-board high-voltage power supply, which state of charge is less than a threshold value, the driver is prompted to stop so as to execute the switching operation, i.e. disconnection from the on-board high-voltage power supply of the battery, that, for example, has run empty, and connection of another fully charged battery to the on-board high-voltage power supply. This results in the advantage of eliminating the need for any special contactors and thus of saving costs.

The preferred embodiments introduced with reference to the motor vehicle according to the invention and the advantages thereof apply correspondingly to the method according to the invention.

BRIEF DESCRIPTION OF THE DRAWING

In the following, the invention will now be described in greater detail with reference to a preferred embodiment and also with reference to the accompanying drawing.

DETAILED DESCRIPTION OF PREFERRED EMBODIMENTS

The exemplary embodiment described hereinafter is a preferred embodiment of the invention. In the embodiment, the described components of the embodiment represent individual features of the invention, which are considered independently of one another and which respectively further refine the invention independently of each other and thus are to be regarded as part of the invention individually or in a combination different than the one shown. Furthermore, the described embodiment can also be complemented by further features of the invention, other than those described above.

Figure 1:
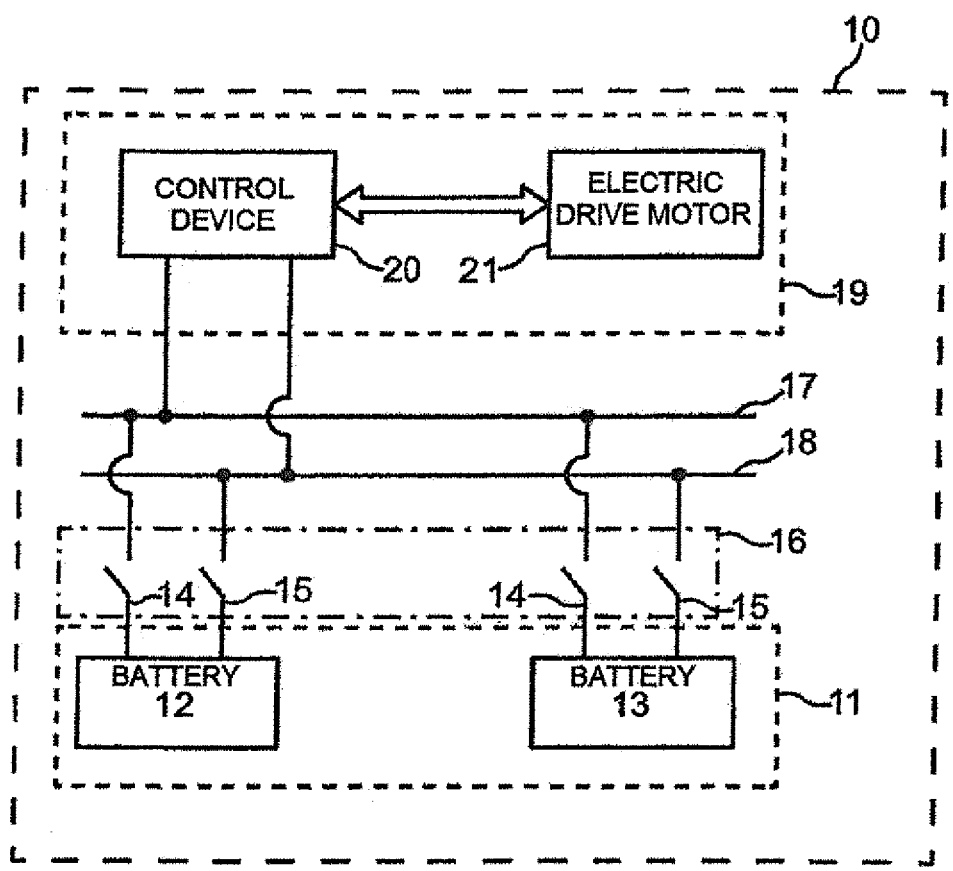
FIG. 1 shows a schematic representation of one embodiment of the motor vehicle according to the invention with on-board high-voltage power supply and multi-battery system.

FIG. 1 shows a motor vehicle 10 with an on-board high-voltage power supply 19 comprised of a control device 20 and an electric drive motor 20, and a multi-battery system 11, comprised of two batteries 12 and 13, with the multi-battery system 11 being connected to the control device 20 via a switching unit 16. The switching unit 16 includes several contactors 14 and 15, with the positive poles of the batteries 15 being connected via contactors 14, respectively, to a line 17, and the negative pole being connected via contactors 14, respectively, to a line 18. The lines 17 and 18 are also conductively connected to the control device 20. The control device 20 may, for example, be an inverter which controls the electric drive motor 21. This control device 20 now detects the state of charge of the batteries 12 and 13 and connects the battery 12 to the on-board high-voltage power supply 19 by closing the contactors 14 and 15 of the battery 12, when the state of charge of the battery 12 is greater than the one of the battery 13. The contactors 14 and 15 of battery 13 remain open. In the event the state of charge of the battery 13 is greater, respective contactors of the battery 13 are closed, whereas the ones of the battery 12 remain open. When the control device now detects during travel that the state of charge of the currently connected battery, for example battery 12, drops below a predetermined critical value, the battery 12 is disconnected from the on-board high-voltage power supply and the battery 13 is connect thereto. This switching operation may take place while driving under load, i.e. when a driving current flows that is greater than a minimum current. Then, the contactors 14 and 15 are designed as the afore-mentioned special contactors. However, also a switching operation during the afore-mentioned "coasting" or when the vehicle 10 is at a standstill, is possible. Then, the contactors 14 and 15 may involve simple contactors.

Provision may also be made for the contactor 15 of each battery to remain permanently closed during vehicle operation, so that line 17 is permanently connected to the on-board high-voltage power supply 19, while only one contactor 14 is closed to thus connect the respective battery to the on-board high-voltage power supply 19. In this case, the contactors 14 are special contactors and the contactors 15 are simple contactors.

In this exemplary embodiment, the multi-battery system 11 includes two batteries 12 and 13. Provision may also be made for more than two batteries.

The batteries of electric and hybrid vehicles are normally disconnected in the off state from the on-board high-voltage power supply by contactors on the plus side and on the minus side. In this way, it is possible to connect multiple batteries to such an on-board high-voltage power supply and to selectively connect or disconnect via the contactors. There is no need to connect the batteries or cells in parallel or to set the voltage situation extremely high in order to increase the range.

Several traction batteries are installed in the vehicle and are all located with the high-voltage connections via switched contactors on the same high-voltage power supply which supplies the driving machine via the power electronics. The used batteries should have the same cell number. Certain deviations are, however, possible because they are not used in parallel and need only be in the operating range of the power electronics. Equally, it is not necessary that the batteries have the same nominal capacity. Ideally, however, the performance data are the same. The central control of the contactors could be established via the power electronics. When the capacity of one battery is exhausted, the latter is disconnected from the power supply and the other battery is connected etc.

One challenge involves switching itself. The contactors are connected in fact in de-energized state, i.e. when starting the vehicle (activating the high-voltage system) or shutting down the vehicle. The described implementation implies a switching under load. For this purpose, there are several solutions. For one, special contactors can be used that are suitable for this purpose. This drives up costs. A fairly simple solution would be to prompt the driver to briefly stop the vehicle. An intelligent solution involves a switching to an operating state during travel, in which there is no load demand ("coasting"). Also in this case, it is advantageous, when the control is established via the power electronics.

Basically, the solution works also with only one contactor, i.e. when the positive or negative pole is permanently connected to the high-voltage system, and only the respective other connection is used when switching. This equally applies to the mentioned special contactors. These would be necessary only on one pole. On the other side, the use of a simple contactor could be possible, which serves only for the complete deactivation during standstill of the vehicle.

The batteries shown here may basically also be located in a same battery housing, but may also be dispersed in the vehicle.

Figure 2:
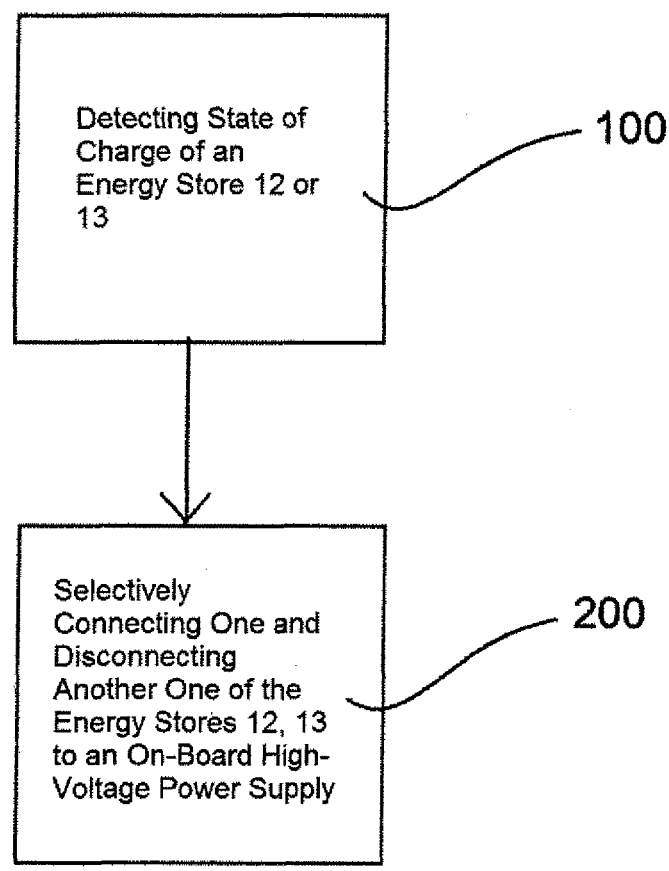
FIG. 2 shows a method of operating a motor vehicle according to the invention.

As shown in FIG. 2, the method according to the invention provides that the control device 20 detects the state of charge of an energy store 12 and 13 in step 100 and, dependent on this state of charge, selectively connects one of the plurality of energy stores 12 and 13 to the on-board high-voltage power supply 19 and again disconnects it from there in step 200, with the respective energy store 12, 13 being separated on the plus side and the minus side from the on-board high-voltage power supply 19 by contactors 14 and 15 and with only either the plus side or the minus side of each of the plurality of energy stores 12, 13 including a contactor 14, 15 which is configured to switch in the presence of a load greater than a minimum load, while the other side has a contactor 14, 15 which satisfies only a lesser load demand than those of the minimum load.

Overall, the example shows, how a multi-battery system increases the electric range.

The invention claimed is:

1. A motor vehicle, comprising:
an electric drive motor;
an on-board high-voltage power system having a plus side and a minus side;
a multi-battery system comprising a plurality of mutually galvanically insulated energy stores for supplying a driving current to the electric drive motor, wherein each of the energy stores has a positive and negative polarity;
a plurality of contactors associated with each of the energy stores, with a first contactor connecting the positive polarity of that energy store to the plus side of the on-board high-voltage power system and a second contactor connecting the negative polarity of that the enemy store to the minus side of the on-board high-voltage power system; and
a control device configured to operate the first and second contactors as a function of a detected state of charge of each energy store by selectively connecting and/or disconnecting the energy stores from the on-board high-voltage power system while supplying the driving current to the electric drive motor,
wherein for each of the energy stores one of the first and second contactors is constructed to switch a driving current that is greater than a minimum current, whereas the other one of the first and second contactors is constructed to switch a driving current that is smaller than or at most equal to the minimum current.

2. The motor vehicle of claim 1, wherein the drive motor includes an inverter to form the control device.

3. The motor vehicle of claim 1, wherein the control device is configured to detect during travel an operating state, in which a load demand is smaller than a predefined threshold value.

4. The motor vehicle of claim 1, further comprising a common housing configured to accommodate the plurality of the energy stores.

5. The motor vehicle of claim 1, wherein the plurality of the energy stores are dispersed in the motor vehicle.

6. The motor vehicle of claim 1, wherein the plurality of the energy stores have different power data.

7. The motor vehicle of claim 1, wherein only one of the plurality of energy stores is connected to the on-board high-voltage power system at one time.

8. A method of operating a motor vehicle, comprising:
supplying a driving current to an electric motor of the motor vehicle from an on-board high-voltage power system having a plus side and a minus side;
detecting with a control device a state of charge of a plurality of mutually galvanically insulated energy stores of a multi-battery system;
while under load when the driving current flows,
selectively connecting, depending on the state of charge, a positive polarity of an energy store to the plus side of the on-board high-voltage power system by closing a first contactor and a negative polarity of the enemy store to the minus side of the on-board high-voltage power system by closing a second contactor, and
disconnecting respective positive and negative polarities of another energy store from the respective plus and minus sides of the on-board high-voltage power system by opening the respective first and second contactors connecting the other energy store to the on-board high-voltage power system, wherein one of the first and second contactors is constructed to switch a driving current that is greater than a minimum current, whereas the other one of the first and second contactors is constructed to switch a driving current that is smaller than or at most equal to the minimum current.

9. The method of claim 8, wherein only one of the plurality of energy stores is connected to the on-board high-voltage power system at one time.

* * * * *